United States Patent Office 3,393,246
Patented July 16, 1968

3,393,246
ISOMERIZATION PROCESS
Frank L. George, Tyler, Tex., assignor to Columbian Carbon Company, New York, N.Y., a corporation of Delaware
No Drawing. Filed Mar. 7, 1966, Ser. No. 532,064
9 Claims. (Cl. 260—666)

ABSTRACT OF THE DISCLOSURE

Processes are described for the isomerization of multi-unsaturated $C_7$-$C_{16}$ cycloaliphatic hydrocarbons to their more thermodynamically stable isomers with an alkali metal catalyst. High reaction rates at low catalyst concentrations are achieved without excessive ring collapse by conducting the isomerization at a temperature of from about 100° F. to about 325° F. until up to about 97% of the hydrocarbon is converted and then completing the reaction at a temperature not exceeding about 250° F. The beneficial effect of such temperature control in reducing the yield of cyclic products having a six member ring is illustrated by the sodium on alumina catalyzed conversion of 1,5-cyclooctadiene to its conjugated isomer, 1,3-cyclooctadiene, with the formation of only minor quantities of 4-vinylcyclohexene.

This invention relates to a process for the isomerization of multi-unsaturated cyclo-aliphatic hydrocarbons containing at least two ethylenic double bonds positioned in a ring of at least seven carbon atoms to more thermodynamically stable isomers thereof. In a more specific respect, the invention provides an improved process for converting 1,5-cyclooctadiene to 1,3-cyclooctadiene at high rates and in high selectivities.

It has previously been proposed to carry out the isomerization of certain olefins, including 1,5-cyclooctadiene, in the presense of a sodium-on-alumina catalyst composition at room temperature and below, for instance down to −60° C. (See the paper "Isomerization of Olefins With Sodium at Low Temperatures" by T. M. O'Grady et al. presented at the Symposium on Carbanion Reactions and Processes of Hydrocarbons, American Chemical Society meeting (Sept. 13–18, 1959 at Atlantic City, N.J.). However, when operating at such low temperatures, relatively large concentrations of catalyst are required in order to obtain reasonable rates of reaction. It would, of course, be desirable to conduct the isomerization reaction at elevated temperatures, thereby enabling higher reaction rates at lower catalyst concentrations. Unfortunately, however, the employment of elevated reaction temperatures leads to the formation of undesirable 4-vinylcyclohexene by-product. Since 4-vinylcyclohexene undergoes many of the reactions for which 1,3-cyclooctadiene is employed, significant quantities thereof cannot be tolerated in the 1,3-cyclooctadiene product.

The present invention is predicated on the discovery that 1,5-cyclooctadiene may be isomerized to 1,3-cyclooctadiene at high rates and high selectivities by contacting the 1,5-cyclooctadiene with an alkali metal catalyst at a temperature within the range of from about 100° F. to about 325° F. during the principal reaction period until up to about 97% of the 1,5-cyclooctadiene is converted, and then carrying out the contacting at a temperature not exceeding about 250° F. until substantially all (e.g. at least 99%) of the 1,5-cyclooctadiene is converted. Thus, by carrying out the reaction at the above-stated temperatures, 1,3-cyclooctadiene may be produced in a high selectivity and at a high rate, while selectivity of 4-vinylcyclohexene by-product may be minimized. I have found that when the isomerization reaction is permitted to come to completion (e.g. above about 97% conversion) at temperatures above about 250° F., an appreciable amount of 4-vinylcyclohexene is formed. Reaction rate and 1,3-cyclooctadiene selectively may be maximized in accordance with a preferred embodiment of the invention by operating at a temperature of 200° F. to 300° F. during the principal reaction period until from about 85% to 95° of the 1,5-cyclooctadiene is converted, and thereafter, at a temperature of from about 100° F. to about 225° F., preferably from 150° F. to 200° F., until substantially all of the 1,5-cyclooctadiene is converted.

It will be understood that the term "conversion" as used herein is determined by the formula:

$$\text{Conversion} = \frac{\text{wt. 1, 5-cyclooctadiene consumed}}{\text{wt. 1, 5-cyclooctadiene fed}} \times 100$$

"Selectivity" of 1,3-cyclooctadiene or 4-vinylcyclohexene products is determined by the formula:

$$\text{Selectivity} = \frac{\text{wt. single isomer produced}}{1, 5\text{-cyclooctadiene consumed}} \times 100$$

The alkali metal catalysts utilized in the practice of the present process do not form a part of the invention. Such catalysts are commercially available and may be prepared by a number of suitable procedures, for example, by melting elemental alkali metal over the surface of a suitable support material. The support material employed is generally alumina, particularly an activated bauxite. Sodium is the preferred alkali metal in preparing the catalysts. The supported catalyst composition may advantageously contain from about 0.1 to about 30 percent alkali metal, although greater or lesser amounts of alkali metal. One distinct advantage of the present invention is that relatively high reaction rates may be obtained even at low catalyst concentrations, compared to the previously proposed low temperature process of O'Grady et al., referred to above. Accordingly, catalyst concentrations of from about 0.1% to about 1.2% based on weight of alkali metal, e.g. sodium, by weight of 1,5-cyclooctadiene, are preferred, although higher and lower concentrations may also be employed.

The isomerization reaction may be carried out by a number of suitable methods. For instance, the feed material may be heated to the desired reaction temperature, i.e. 100° F. to 325° F., preferably 200° F. to 300° F., after which time sufficient catalyst may be added thereto to permit the reaction to proceed at the desired rate, while controlling the temperature to give substantially isothermic conditions. Before conversion exceeds 97%, and preferably when the conversion is from 85% to 95%, the temperature of the reaction mixture is adjusted (by cooling the reaction mix, if necessary) to a value below about 250° F., advisably from about 100° F. to about 225° F. and most preferably within the range of 150° F. to 200° F. The temperature is then maintained at this level until conversion is substantially complete, i.e. 99% to 100%.

A suitable alternative procedure contemplates heating the feed material to some temperature below the desired reaction temperature, adding a sufficient quantity of catalyst thereto and allowing the reaction to proceed during the principal reaction period at the autogenous temperature developed by the exothermic reaction until the above-noted conversion level is achieved. The quantity of catalyst added should, of course, be sufficient to provide an autogenous reaction temperature within the range of 100° F. to 325° F., e.g. 200° F. to 300° F. The reaction mixture is then cooled, if necessary, to allow the conversion to approach completion at a temperature below 250° F., e.g. 150° F. to 200° F., as previously noted.

Various other suitable procedures for practicing the invention will be apparent to those skilled in the art.

While the invention has particular applicability to the isomerization of 1,5-cyclooctadiene to 1,3-cyclooctadiene to achieve optimum rates of reaction, while minimizing production of undesirable by-products such as 4-vinylcyclohexene, it will, of course, be appreciated that the invention may also be used in the isomerization of other multi-unsaturated cycloaliphatic hydrocarbons containing at least two ethylenic double bonds positioned in a ring of from about 7 to about 16 carbon atoms, the double bonds being separated from each other by at least one hydrogen-bearing ring carbon atom. Illustrative of such isomerization reactions are: 1,3-cyclononadiene to 1,5-cyclononadiene; 1,5-cyclodecadiene to 1,6-cyclodecadiene; and 1,5-cyclododecadiene to 1,3-cyclododecadiene. Thus, when the present invention is applied to the isomerization of 1,5-cyclodecadiene to 1,6-cyclodecadiene, formation of divinylcyclohexene by-product is minimized. Preferably, the isomerization of 1,5-cyclodecadiene is carried out at a temperature of from about 200° F. to about 275° F. until about 85% to about 95% of the 1,5-cyclodecadiene is converted to isomer product, and at a temperature of from about 100° F. to about 200° F. thereafter.

The present process may also be used to isomerize the geometric configuration of multi-unsaturated cycloaliphatic hydrocarbons. For instance, a mixture of 90% cis-, 10% trans-1,3-cyclooctadiene may be isomerized to substantially 100% cis-isomer.

The invention will now be further described in reference to the following specific examples, which are presented solely to illustrate the invention and the advantages thereof, and accordingly are not to be interpreted as being limitative of its scope.

A series of runs is conducted using a mixture of 96.8 wt. percent 1,5-cyclooctadiene; 3.0 wt. percent 1,3-cyclooctadiene and 0.2 wt. percent 4-vinylcyclohexene as the feed material and a finely-divided composition of 15% by weight sodium on activated bauxite as the catalyst. In each of the runs, 10 gallons of feed mixture (74 lbs. of 1,5-cyclooctadiene) are dried over silica gel and added to a 20-gallon drum reactor provided with a portable mixer for stirring the reactor contents and an internal cooling coil for subsequently cooling the contents. Electric strip heaters covered with a layer of insulation are fitted around the outside of the reactor to heat the feed mixture to a temperature of approximately 125° F. The sodium-on-alumina catalyst composition is then added to the heated feed mixture in an amount of 350 grams over a period of 10 minutes. The temperature of the reaction is controlled by adding additional heat via the strip heaters. In Runs 2 and 3, cold water is circulated through the cooling coil in the reactor after approximately 90% of the 1,5-cyclooctadiene is converted for the purpose of reducing the temperature of the reaction mixture as noted below. Samples of the reaction mixture are taken at various intervals and are analyzed by gas chromatography.

In Run 1, which serves as the control, the temperature of the reaction mixture is maintained substantially constant at 275° F. after a conversion level of about 90% is achieved. In Runs 2 and 3, the temperature of the reaction mixture is reduced to 237° F. and 191° F., respectively, upon achieving about 90% conversion, by passing cold water through the internal reactor cooling coils.

The details of the runs are set forth in Table I. In the table, cyclooctadiene is abbreviated as "COD" and 4-vinylcyclohexene is abbreviated as "VCH." Time is measured from the commencement of catalyst addition to the heated feed.

TABLE I

| Time (Min.) | Run 1 ||||||| Run 2 ||||||| Run 3 |||||||
|---|---|---|---|---|---|---|---|---|---|---|---|---|---|---|---|---|---|---|---|---|---|
| | Temp. (°F.) | Analysis (W. percent) ||| Percent Conversion | Percent COD-1,3 Selectivity | | | Temp. (°F.) | Analysis (W. percent) ||| Percent Conversion | Percent COD-1,3 Selectivity | | | Temp. (°F.) | Analysis (W. percent) ||| Percent Conversion | Percent COD-1,3 Selectivity |
| | | COD-1,5 | COD-1,3 | VCH | | | | | | COD-1,5 | COD-1,3 | VCH | | | | | | COD-5,1 | COD-1,3 | VCH | | |
| 0 | 125 | 96.8 | 3.0 | 0.2 | | | | | 125 | 96.8 | 3.0 | 0.2 | | | | | 125 | 96.8 | 3.0 | 0.2 | | |
| 5 | 172 | | | | | | | | 175 | | | | | | | | 172 | | | | | |
| 10 | 267 | | | | | | | | 261 | | | | | | | | 260 | | | | | |
| 15 | 273 | 8.8 | 90.0 | 0.3 | 90 | 99.9 | | | 278 | 9.8 | 89.9 | 0.3 | 90 | 99.9 | | | 276 | 34.8 | 60.2 | 0.2 | | |
| 20 | 275 | | | | | | | | 271 | | | | | | | | 275 | 8.8 | 90.9 | 0.3 | 64.2 | 91.8 |
| 25 | 277 | 0.2 | 95.2 | 4.6 | 99.7 | 95.4 | | | 239 | 3.2 | 96.3 | 0.5 | 97 | 99.5 | | | 205 | | | | | |
| 30 | 272 | 0.1 | 95.2 | 4.7 | 99.9+ | 95.2 | | | 237 | 0.1 | 99.1 | 0.8 | 99.94 | 99.2 | | | 191 | 0.1 | 99.6 | 0.3 | 99.9+ | 99.9 |
| 40 | 271 | | | | | | | | 236 | | | | | | | | 190 | | | | | |

As can be seen from the data of Runs 2 and 3, high reaction rates and 1,3-cyclooctadiene selectivities are obtained by operating at a relatively high reaction temperature during the principal reaction period up to a conversion of about 90% and thereafter maintaining the temperature below about 250° F. Run 3, wherein the reaction mixture is quickly cooled to a temperature of 190° F. to 200° F. after a conversion level of about 90% is achieved, enables particularly outstanding 1,3-cyclooctadiene selectivities. On the other hand, when the reaction temperature is maintained at a relatively high value upon reaching a conversion level of 90%, e.g. 275° F. as in control Run 1, formation of 1,3-cyclooctadiene is decreased, while selectivity of undesirable 4-vinylcyclohexene by-product is increased.

It will, of course, be understood that various changes may be made in the embodiments which have been referred to above to describe the invention without departing from the spirit and scope of the invention as expressed in the appended claims.

Therefore, I claim:

1. Process for converting a monocyclic cycloaliphatic hydrocarbon containing two ethylenic double bonds positioned in a ring of 7 to about 16 carbon atoms, the double bonds being separated from each other by at least one hydrogen-bearing ring carbon atom, to its thermodynamically more-favored isomer having the same number of ring carbon atoms which consists essentially of contacting said hydrocarbon with an alkali metal at a temperature within the range of from about 100° F. to about 325° F. during the principal reaction period until up to about 97% of said hydrocarbon is converted, and then carrying out said contacting at a temperature not exceeding about 250° F. until substantially all of said hydrocarbon is converted.

2. Process as in claim 1 wherein said hydrocarbon is contacted with said alkali metal at a temperature of from about 200° F. to about 300° F. during the principal reaction period until about 85%–95% of said hydrocarbon is converted, and thereafter at a temperature of from about 100° F. to about 225° F.

3. Process as in claim 2 wherein said hydrocarbon is contacted with alkali metal at a temperature of from about 150° F. to about 200° F. after from about 85% to about 95% thereof is converted.

4. Process as in claim 1 wherein the alkali metal is employed in a concentration of from about 0.1% to about 1.2% alkali metal by weight of said hydrocarbon.

5. Process as in claim 4 wherein said alkali metal is sodium supported on an alumina carrier.

6. Process as in claim 1 wherein said monocyclic cycloaliphatic hydrocarbon is 1,5-cyclooctadiene and said thermodynamically more-favored isomer is 1,3-cyclooctadiene.

7. Process as in claim 1 wherein said monocyclic cycloaliphatic hydrocarbon is 1,5-cyclodecadiene and said thermodynamically more-favored isomer is 1,6-cyclodecadiene.

8. Process as in claim 6 wherein said 1,5-cycloactadiene is contacted with sodium on alumina at a temperature of from about 200° F. to about 300° F. during the principal reaction period until about 85% to about 95% of said 1,5-cyclooctadiene is converted, and at a temperature of from about 150° F. to about 200° F. thereafter.

9. Process as in claim 7 wherein said 1,5-cyclodecadiene is contacted with sodium on alumina at a temperature of from about 200° F. to about 275° F. during the principal reaction period until about 85% to about 95% of said 1,5-cyclodecadiene is converted and at a temperature of from about 100° F. to about 200° F. thereafter.

References Cited

UNITED STATES PATENTS

| | | | |
|---|---|---|---|
| 3,326,909 | 6/1967 | Perry | 260—666 |
| 3,326,991 | 6/1967 | Amagasa | 260—666 |
| 3,124,621 | 3/1964 | Crain et al. | 260—666 |
| 3,278,618 | 10/1966 | Amagasa | 260—666 |

OTHER REFERENCES

W. O. Haag et al., J. Amer. Chem. Soc., 82, pp. 387–391, 1960.

DELBERT E. GANTZ, *Primary Examiner.*

VERONICA O'KEEFE, *Assistant Examiner.*